United States Patent
Fujimoto

(10) Patent No.: US 7,030,944 B2
(45) Date of Patent: *Apr. 18, 2006

(54) LIQUID CRYSTAL DISPLAY DEVICE WITH ROUGHENED SURFACES TO REDUCE MOIRÉ FRINGE EFFECTS

(75) Inventor: Kazushi Fujimoto, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/460,075

(22) Filed: Dec. 14, 1999

(65) Prior Publication Data

US 2003/0142249 A1 Jul. 31, 2003

(30) Foreign Application Priority Data

Dec. 14, 1998 (JP) .................................. 10-354407

(51) Int. Cl.
G02F 1/1335 (2006.01)

(52) U.S. Cl. ..................... 349/64; 349/65; 349/112; 349/137

(58) Field of Classification Search ................ 349/96, 349/95, 61–65, 112, 137
See application file for complete search history.

(56) References Cited

U.S. PATENT DOCUMENTS

| | | | | |
|---|---|---|---|---|
| 4,709,988 A * | 12/1987 | Kai et al. | ..................... | 359/613 |
| 5,280,371 A * | 1/1994 | McCartney et al. | .......... | 349/64 |
| 5,724,108 A * | 3/1998 | Shibata | .......................... | 349/62 |
| 5,745,199 A * | 4/1998 | Suzuki et al. | ................. | 349/95 |
| 5,753,937 A * | 5/1998 | Shimomaki et al. | .......... | 257/59 |
| 5,783,299 A * | 7/1998 | Miyashita et al. | ........... | 428/329 |
| 6,166,790 A * | 12/2000 | Kameyama et al. | ........... | 349/96 |
| 6,259,496 B1 * | 7/2001 | Kashima | ....................... | 349/62 |
| 6,268,961 B1 * | 7/2001 | Nevitt et al. | ................. | 359/488 |
| 6,339,501 B1 * | 1/2002 | Kameyama et al. | ......... | 359/485 |
| 6,356,389 B1 * | 3/2002 | Nilsen et al. | ................ | 359/625 |
| 6,385,139 B1 * | 5/2002 | Arikawa et al. | ............. | 368/239 |
| 6,474,827 B1 * | 11/2002 | Shinohara et al. | ............ | 362/31 |
| 6,616,289 B1 * | 9/2003 | Umemoto et al. | ............ | 362/31 |

FOREIGN PATENT DOCUMENTS

| | | | |
|---|---|---|---|
| JP | 62-199722 | | 9/1987 |
| JP | 63-193224 | | 12/1987 |
| JP | 01-234822 | | 9/1989 |
| JP | 1-234822 | * | 9/1989 |
| JP | 2-199444 | * | 8/1990 |
| JP | 03-120037 | | 5/1991 |
| JP | 4-175727 | * | 6/1992 |
| JP | 04-175727 | | 6/1992 |
| JP | 05-53103 | | 3/1993 |
| JP | 06-34961 | | 2/1994 |

(Continued)

Primary Examiner—Andrew Schechter
Assistant Examiner—Mike Qi
(74) Attorney, Agent, or Firm—Scully, Scott, Murphy & Presser

(57) ABSTRACT

A liquid crystal display device includes a liquid crystal display panel obtained by adhering upper and lower polarizing plates to upper and lower surfaces, respectively, of an electrode substrate. The upper polarizing plate has a first roughened surface on its outer surface. The first roughened surface is formed for the purpose of antiglare. The lower polarizing plate has a second roughened surface on its outer surface. The second roughened surface is formed to have a surface roughness equivalent to or less than that of the first roughened surface. As a result, a moiré fringe is decreased.

13 Claims, 6 Drawing Sheets

FOREIGN PATENT DOCUMENTS

| | | |
|---|---|---|
| JP | H6-230356 | 8/1994 |
| JP | H7-128662 | 5/1995 |
| JP | 08-68997 | 3/1996 |
| JP | 8-95029 * | 4/1996 |
| JP | 08-95029 | 4/1996 |
| JP | 10-96922 * | 4/1998 |

* cited by examiner

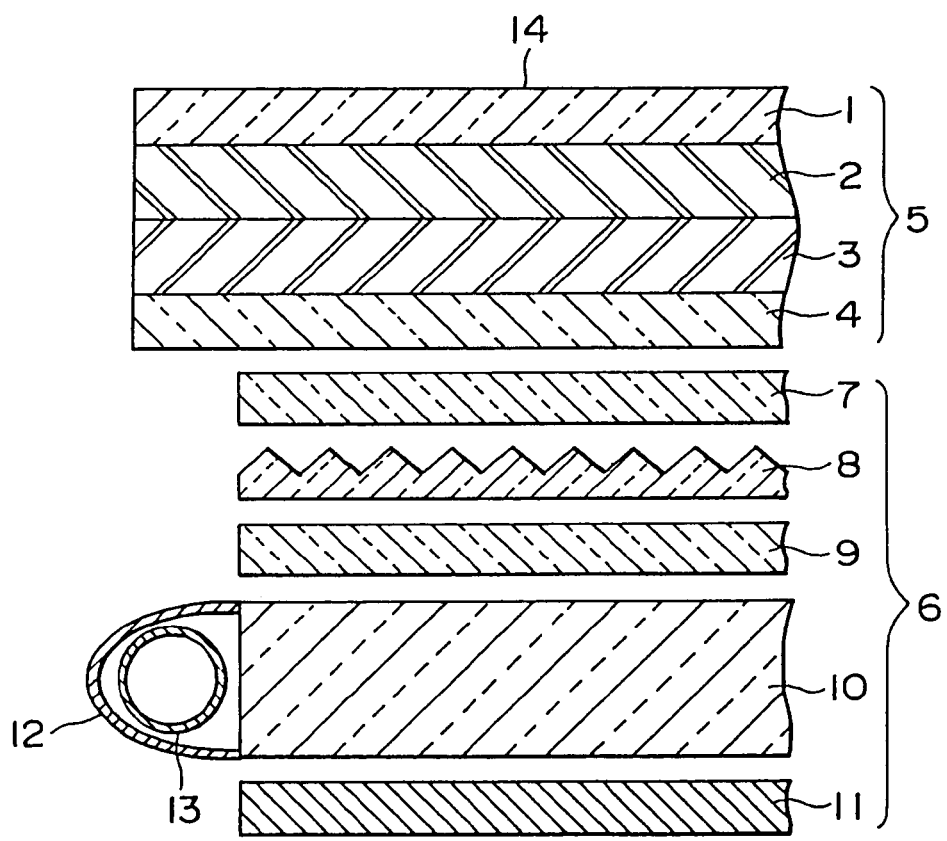

| HAZE \ TRANSMISSION CHARACTERISTICS | LENS SHEET SIDE | | | |
|---|---|---|---|---|
| LOW POLARIZING PLATE | | TYPE A | TYPE B | TYPE C | TYPE D |
| 5 ± 2% | 1 | 2 | 4 | 4 |
| 9 ± 2% | 1 | 2 | 4 | 5 |
| 13 ± 3% | 1 | 3 | 4 | 5 |
| 28 ± 4% | 2 | 3 | 5 | 5 |

1 SEEN WELL   2 SEEN   3 SOMEWHAT SEEN   4 HARDLY SEEN   5 NOT SEEN AT ALL

| HAZE \ TRANSMISSION CHARACTERISTICS | LENS SHEET SIDE | | | |
|---|---|---|---|---|
| LOW POLARIZING PLATE | | TYPE A | TYPE B | TYPE C | TYPE D |
| 5 ± 2% | 99.5% | 99% | 97.8% | 97% |
| 9 ± 2% | 99.2% | 98.4% | 97% | 96.5% |
| 13 ± 3% | 99% | 97.8% | 96% | 95% |
| 28 ± 4% | 96% | 92.5% | 88% | 85% |

LIQUID CRYSTAL DISPLAY DEVICE WITH ROUGHENED SURFACES TO REDUCE MOIRÉ FRINGE EFFECTS

BACKGROUND OF THE INVENTION

1. Field of the Invention

The present invention relates to a liquid crystal display device and, more particularly, to a liquid crystal display device in which occurrence of a moiré fringe is suppressed and display nonuniformity produced by a moiré fringe is accordingly decreased so that display quality is improved.

2. Description of the Prior Art

In recent years, notebook type personal computers are becoming remarkably low-profile and lightweight so that they can be carried easily. Accordingly, liquid crystal display devices are also becoming low-profile and lightweight. Making low-profile a transmission liquid crystal display device having a backlight amounts to making the backlight low-profile. Components most influenced by rendering the backlight low-profile include a light guide plate. Making the light guide plate low-profile narrows its light-incident end face and decreases the incident light amount, leading to a decrease in luminance. Hence, a measure for outputting incident light to a liquid crystal display panel efficiently is necessary. Therefore, a lens sheet obtained by forming a group of small prisms on one surface of a sheet to provide a light condensing effect is often used.

In order to improve the luminance of the backlight, a liquid crystal display device obtained by stacking two lens sheets to enhance the light condensing effect is available.

FIG. 1 is a sectional view showing the arrangement of a conventional liquid crystal display device described above in which two lens sheets are stacked. This liquid crystal display device is comprised of a liquid crystal display panel 5, backlight 6, driver IC (not shown) for driving the liquid crystal display panel 5, and signal control circuit (not shown) for the driver IC. The liquid crystal display panel 5 is comprised of upper and lower electrode substrates 2 and 3 arranged adjacent to each other, and upper and lower polarizing plates 1 and 4 respectively adhered to the outer surfaces of the upper and lower electrode substrates 2 and 3. The backlight 6 is comprised of a fluorescent tube 13, reflector 12, light guide plate 10, reflecting sheet 11, diffusing sheet 9, upper lens sheet 7, and lower lens sheet 8. The outer surface of the upper polarizing plate 1 is roughened to form a roughened surface 14 for antiglare. In this prior art, a group of substantially parallel ring-like curves (fringes) form to produce display nonuniformity, impairing the display quality. According to an analysis of the cause of the fringes, two lattice fringe images having an equal grating constant are superposed on each other to form an interference fringe that appears as a "moiré fringe". A moiré fringe is an interference fringe generated when two gratings having an equal grating constant are stacked on each other at a small angle. The grating that produces the moiré fringe results from the surface shape of a lens sheet.

The moiré fringe described above will be explained.

FIGS. 2A and 2B show how a lens sheet generates grating fringes. As shown in FIG. 2B, prisms are formed on a lens sheet 20. Depending on the angle of incidence of light, light incident on the lens sheet 20 is reflected by the slant of a prism to have a directivity. Thus, as shown in FIG. 2A, a grating 18 in which bright portions formed by reflected light beams 19a and dark portions where reflected light beams 19b are not present is generated.

FIGS. 3A and 3B show the principle of generation of a moiré fringe by lens sheets. As shown in FIG. 3B, grating fringes (real-image grating) 21 generated in the upper lens sheet 7 include two reflection paths. According to one path, light is directly reflected by the upper lens sheet 7. According to the other path, light is transmitted through the upper lens sheet 7 and is reflected by the lower lens sheet 8. The grating fringes generated by the former path correspond to a grating directly generated in the upper lens sheet 7, which is a real-image grating 21. The grating fringes generated by the latter path correspond to a reflected image of the real-image grating 21, which is a virtual-image grating 22. When the real-image grating 21 and virtual-image grating 22 are superposed on each other at a small angle, as shown in FIG. 3A, a moiré fringe 23 is formed. In practice, a displacement of small angle is produced by deflection or the like of the lens sheets. The lines of one grating overlap those of the other grating. A line obtained by connecting points where these lines intersect each other has a higher contrast than that of the original lines of the gratings, so that it is visually recognized as a moiré fringe. The moiré fringe is traced back to the gratings that occur due to the surface shapes of the lens sheets. Hence, the moiré fringe can be eliminated only by using lens sheets which have a surface shape other than a prism type shape and which provide a light condensing effect equivalent to or better than that of prism type lens sheets.

Other than a prism type lens sheet, however, no lens sheet is available which has a high light condensing effect and can be available at a low cost almost equal to that of the prism type lens sheet. If an optical member such as a diffusing sheet is further used to suppress the moiré fringe, the thickness of the liquid crystal display device increases, leading to an additional increase in cost for this optical member. A means must therefore be taken to prevent the moiré fringe without impairing the low-profile shape.

In view of the above problems, various conventional examples as follows are proposed.

As the first conventional example, a liquid crystal display device is described in Japanese Unexamined Patent Publication No. 04-175727. According to this device, the outer surfaces of polarizing plates on the upper and lower surfaces of a liquid crystal display element are antiglare-processed. This prevents occurrence of Newton rings (interference fringes). Although not specifically described, the antiglare process probably means formation of three-dimensional shapes.

As the second conventional example, a liquid crystal display device is described in Japanese Unexamined Patent Publication No. 05-053103. According to this device, the lower surface of a lower polarizing plate is antiglare-processed to provide a polarizing plate which is not easily damaged. An upper polarizing plate is also antiglare-processed, in the same manner as in the prior art.

As the third conventional example, a liquid crystal television is described in Japanese Unexamined Utility Model Publication No. 62-193224. According to this television, anti-reflecting coatings are formed in tight contact with upper and lower polarizing plates.

As the fourth conventional example, a liquid crystal display device is described in Japanese Unexamined Patent Publication No. 01-234822. According to this device, a light scattering surface is formed on the lower surface of a lower polarizing plate. This aims at removing and decreasing reflection by the surface of a television. The light scattering surface forms a roughened surface having small three-dimensional shapes. This device also aims at eliminating interference of light emerging from a backlight.

As the fifth conventional example, a liquid crystal display device is described in Japanese Unexamined Patent Publication No. 62-199722. According to this device, the outer surface of a polarizing plate on the rear side forms a roughened surface. This invention aims at making unnecessary a rear reflecting plate (ordinarily called a diffusing plate) and furthermore a light guide plate.

As the sixth conventional example, a liquid crystal display device and a polarizing film used by it are described in Japanese Unexamined Patent Publication No. 06-034961. A light diffusing layer is formed on the surface of a polarizing film on the rear side of the liquid crystal panel of this liquid crystal display device. The light diffusing layer has small three-dimensional shapes (small embosses). This invention aims at making a light guide plate unnecessary.

As the seventh conventional example, a laminated body is described in Japanese Unexamined Patent Publication No. 03-120037. In this laminated body, small three-dimensional shapes are formed by coating on the surface of one or each of films to be laminated, so that interference fringes do not stand out when the films are merely stacked, not adhered to each other.

The conventional examples described above have the following problems.

In the first conventional example, although Newton ring interference fringes may be suppressed, a moiré fringe cannot be suppressed. This is obvious because a moiré fringe is recognized even when the roughnesses of the roughened surfaces of the polarizing plates are increased. A moiré fringe is caused by grating fringes resulting from the surface shapes of prism type lens sheets. To suppress the moiré fringe, the occurrence of the grating fringes themselves must be suppressed, or the grating fringes must be scattered by roughened surfaces so that they become thin. In the first conventional example, use of lens sheets is not anticipated, and only the antiglare process for the polarizing plates is explained. In order to eliminate a moiré fringe, however, the surface roughening process for the lens sheet is also significant. If the surface roughnesses are increased so that the grating fringes become thin with only the antiglare process for the polarizing plates, light from the backlight is scattered by the roughened surfaces to decrease the luminance, which is another problem.

In the second conventional example, the influence applied by the surface roughness of a roughened surface to the optical characteristics such as luminance is not described. This is because the use of a prism type lens sheet is used in order to realize low-profile, high-luminance liquid crystal display device is not contemplated, and roughening the lens sheet in order to suppress a moiré fringe generated by the lens sheet is not an option here.

The third conventional example does not contribute to making a liquid crystal display device low-profile, and the cost is increased. This is because since anti-reflecting coating substrates are prepared separately of the polarizing plates, the thickness of the device increases by the thickness of the anti-reflecting coating substrates. Also, an extra cost is required by the anti-reflecting coating substrates.

In the fourth conventional example, although interference fringes may be suppressed, it does not contribute to making the liquid crystal display device low-profile. This is because since a diffusing plate is arranged on that surface of the backlight which opposes the liquid crystal display panel, the thickness of the device increases by the thickness of the diffusing plate.

In the fifth conventional example, the influence of the surface roughness of the roughened surface on the optical characteristics such as luminance is not described, in the same manner as in the second conventional example. This is because the use of a prism type lens sheet in order to realize low-profile, high-luminance liquid crystal display device is not anticipated, and roughening the lens sheet in order to suppress a moiré fringe caused by the lens sheet is not an option here.

In the sixth conventional example, if the light scattering layer is merely provided, the luminance uniformity suffers. This is because the light transmission characteristics of the light scattering layer of the polarizing film proposed in this conventional example are those obtained when an incident light beam becomes incident in the same direction as that of the normal to the light scattering layer. In the liquid crystal display device using the polarizing film, since a light source is disposed on the end portion of the device, light from the light source strikes the liquid crystal display device obliquely and is specularly reflected by the reflecting plate. The incoming light on the light scattering layer of the polarizing plate accordingly strikes in an oblique direction and not in the direction of the normal to the light scattering layer. Hence, the light transmission characteristics become different from those obtained when light becomes incident in the direction of normal to the light scattering layer. Since the angle of light specularly reflected by the reflecting plate differs between a position close to the light source and a position far from it, the light transmission characteristics change within the display surface of the liquid crystal display device, and the luminance does not become constant.

In the seventh conventional example, formation of roughened surfaces on articles to be stacked can undesirably decrease the luminance. This is because of if a roughened surface is formed on each of particles to be stacked, light from the backlight may be scattered when transmitting through the articles, and its transmission light amount may decrease. Nevertheless, the relationship between the roughness of the roughened surface of each of the particles to be stacked and the luminance is not considered.

SUMMARY OF THE INVENTION

The present invention has been made in consideration of the above situation in the prior art, and has as its object to provide a liquid crystal display device in which display nonuniformity produced by a moiré fringe generated by a lens sheet having a surface formed with a prism group is decreased so that the display quality is improved.

In order to achieve the above object, according to the first aspect of the present invention, there is provided a liquid crystal display device comprising a liquid crystal display panel obtained by adhering upper and lower polarizing plates to upper and lower surfaces, respectively, of an electrode substrate, the upper polarizing plate having a first roughened surface, which is formed for the purpose of antiglare, on an outer surface thereof, and the lower polarizing plate having a second roughened surface, which is formed so as to have a surface roughness not more than that of the first roughened surface, on an outer surface thereof, whereby a moiré fringe is decreased.

In order to achieve the above object, according to the second aspect of the present invention, there is provided a liquid crystal display device comprising: a liquid crystal display panel having an electrode substrate unit and upper and lower polarizing plates, the electrode substrate unit being comprised of upper and lower electrode substrates arranged adjacent to each other, and the upper and lower polarizing plates being adhered to two outer surfaces, respectively, of the electrode substrate units so as to transmit only light having a polarization plane in a constant direction; a backlight unit having a fluorescent tube serving as a light source, a reflector, a light guide plate, a reflecting sheet and a diffusing sheet sequentially arranged above the light guide plate to be substantially parallel to the light guide plate, and a plurality of lens sheets inserted between the diffusing sheet and the electrode substrate unit substantially parallel to each other; and a driver IC for driving the liquid crystal display panel and a signal control circuit for the driver IC, wherein the upper polarizing plate has a first roughened surface, on an outer surface thereof, which is formed for antiglare, and the lower polarizing plate has a second roughened surface, on an outer surface thereof, which is formed so as to have a surface roughness not more than that of the first roughened surface, whereby a moiré fringe generated by a presence of the plurality of lens sheets is decreased.

The liquid crystal display device according to the first and second aspects can have the following secondary aspects.

The lower polarizing plate has a haze (value of cloudiness) of approximately 5% to 13%.

The lens sheets are two sheets consisting of an upper lens sheet arranged near the liquid crystal display panel and a lower lens sheet arranged to be separate from the liquid crystal display panel.

Each of the upper and lower lens sheets is formed with a group of small prisms on one surface thereof.

The upper lens sheet has a third roughened surface, which has been surface-roughened, on the other surface thereof, and the lower lens sheet has a fourth roughened surface, which has been surface-roughened, on the other surface thereof.

The upper and lower lens sheets are arranged such that major axes of the prisms thereof are perpendicular to each other.

According to the present invention having the above aspects, the problem of a lattice fringe image formed by the presence of the prism type lens sheets, which cause a moiré fringe, is solved by surface-roughening the lower polarizing plate and the lens sheets without adding any other extra optical member such as a diffusing sheet. Therefore, a moiré fringe can be prevented without increasing the thickness of the liquid crystal display device and increasing the member cost.

As shown in the results of FIGS. 6 and 7 (to be described later), a preferable roughened surface, in which the luminance is not decreased and a moiré fringe is not recognized, is found. More specifically, experiments show that a combination of a lower polarizing plate having a haze of 5% to 13% and lens sheets respectively having type C transmission characteristics and type D transmission characteristics is preferable in preventing a moiré fringe, because the luminance is 95% or more that of the conventional value and drops little compared to the conventional value. As a result, both an improvement in display quality and prevention in decrease of the luminance can be realized simultaneously.

More specifically, the polarizing plate and the lens sheets are subjected to the roughening process to suppress a moiré fringe generated by the groups of triangular prisms on the lens sheets, so that the display quality is improved. Also, in spite of the roughening process of the polarizing plate and the lens sheets, a luminance almost equal to that obtained when the roughening process is not performed can be obtained.

As described above, to prevent the moiré fringe by only the surface roughening process of the polarizing plate, the degree of the roughening process must be increased. Accordingly, light scattering increases to decrease the luminance. According to the present invention, when the roughening process of the polarizing plate and the roughening process of the lens sheets are combined in an optimum manner, the moiré fringe can be prevented while the luminance does not substantially decrease.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIG. 1 is a sectional view showing a schematic arrangement of a conventional liquid crystal display device;

DETAILED DESCRIPTION OF THE PREFERRED EMBODIMENTS

Some preferred embodiments of the present invention will be described below in detail with reference to the accompanying drawings.

Figure 4:
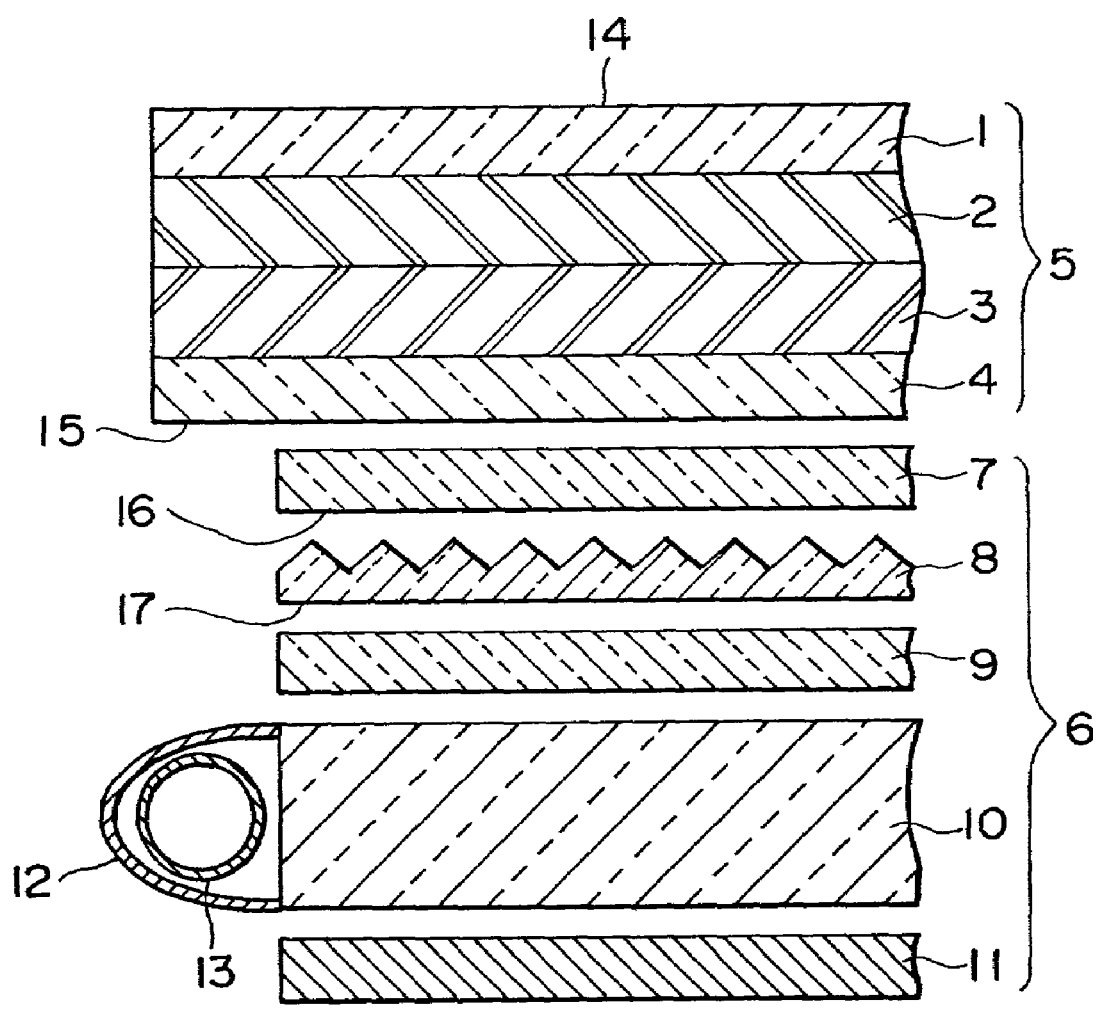
FIG. 4 is a sectional view showing the schematic arrangement of a liquid crystal display device according to an embodiment of the present invention.

FIG. 4 is a sectional view showing the arrangement of a liquid crystal display device according to an embodiment of the present invention. This liquid crystal display device is mainly comprised of a liquid crystal display panel 5, backlight unit 6, driver IC (not shown) for driving the liquid crystal display panel 5, and signal control circuit (not shown) for the driver IC. The liquid crystal display panel 5 is comprised of upper and lower electrode substrates 2 and 3 arranged adjacent to each other to form an electrode substrate unit, and upper and lower polarizing plates 1 and 4 respectively adhered to the outer surfaces of the upper and lower electrode substrates 2 and 3. The backlight unit 6 is comprised of a fluorescent tube 13 serving as a light source, reflector 12, light guide plate 10, reflecting sheet 11, diffusing sheet 9, upper lens sheet 7, and lower lens sheet 8. The outer surface of the upper polarizing plate 1 is roughened to form a roughened surface 14 for antiglare. In this embodiment, a roughened surface 15 is formed also on the outer surface of the lower polarizing plate 4 which need not be roughened originally. The surface roughness of the roughened surface 15 is equal to or smaller than that of the roughened surface 14. This is because if the roughness of the roughened surface 15 is larger than that of the roughened surface 14, light from the backlight unit 6 is scattered by the roughened surface 15, and the amount of light transmitting through the liquid crystal display panel 5 decreases to decrease the luminance. As the upper and lower lens sheets 7 and 8, those each having one surface formed with a group of small prisms are used. Those surfaces of the upper and lower lens sheets 7 and 8 which are opposite to the surfaces where the prism groups are formed are surface-roughened to form roughened surfaces 16 and 17, respectively. The two lens sheets 7 and 8 are arranged such that the major axes of the prisms of the upper lens sheet 7 are perpendicular to those of the lower lens sheet 8.

How a moiré fringe is suppressed in this embodiment will be explained with reference to FIGS. 2A and 2B, and FIGS. 3A and 3B described above.

Figure 2A:
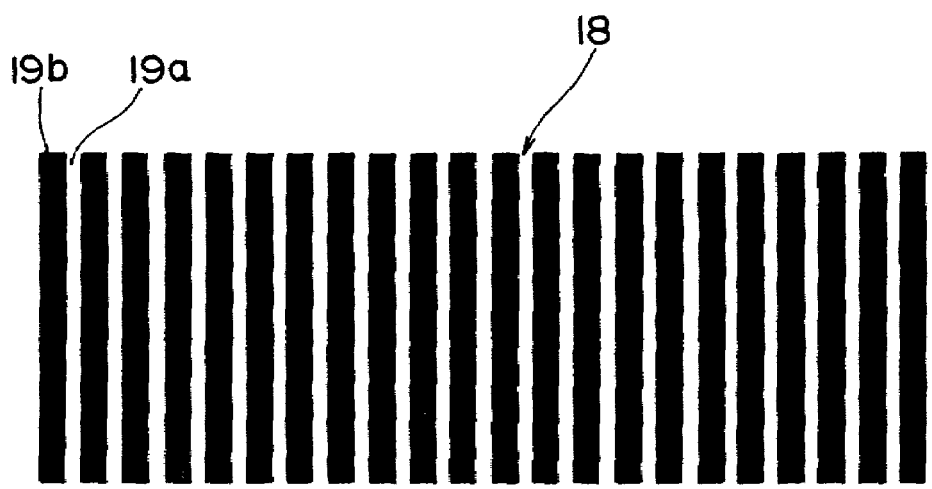
FIGS. 2A and 2B are views respectively showing grating fringes generated by a prism type lens sheet and how light is reflected by this lens sheet.
Figure 2B:
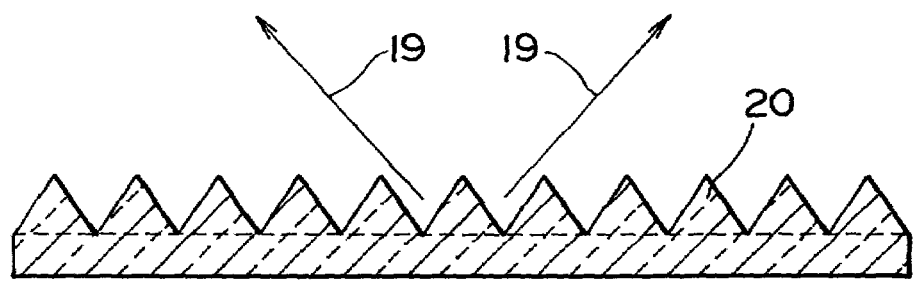

FIGS. 2A and 2B respectively show a grating formed by a prism type lens sheet. This grating fringes produce a moiré fringe. The grating fringes shown in FIG. 2A, which cause the moiré fringe, form in the following manner. When light is reflected by the slants of the group of prisms formed on the surface of the lens sheet 20, as shown in FIG. 2B, reflected light beams 19 acquire directivity, thus forming a moiré fringe. According to this embodiment, when the roughened surfaces 15, 16, and 17 are respectively formed on one surface the lower polarizing plate 4, one surface of the upper lens sheet 7, and one surface of the lower lens sheet 8, which are shown in FIG. 4, grating fringes as the cause of the moiré fringe are scattered. The gratings become thin, so the moiré fringe can be suppressed.

Figure 3A:
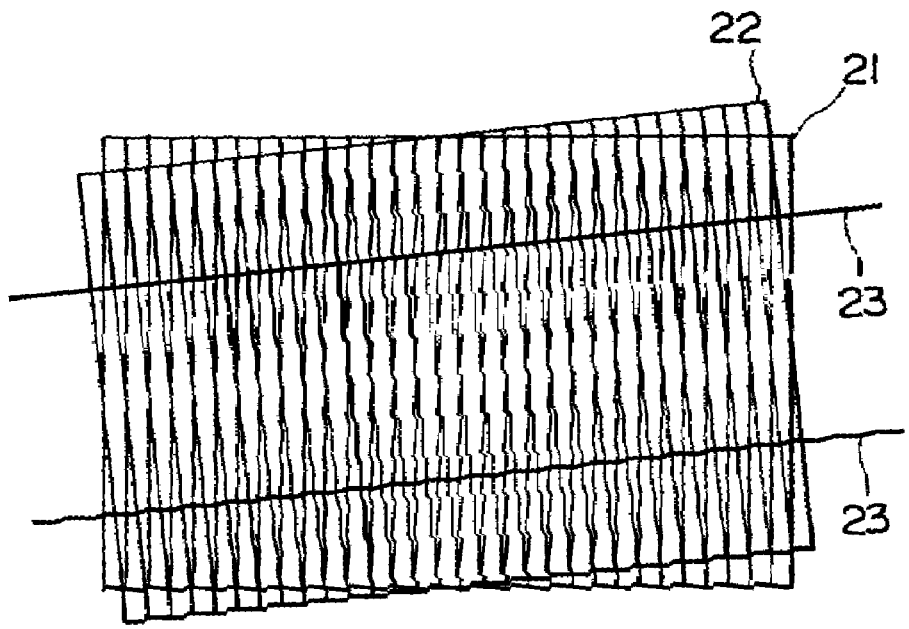
FIGS. 3A and 3B are views showing the interference fringes of a moiré fringe and how light is reflected by upper and lower lens sheets, respectively, in order to explain the principle of occurrence of a moiré fringe.
Figure 3B:
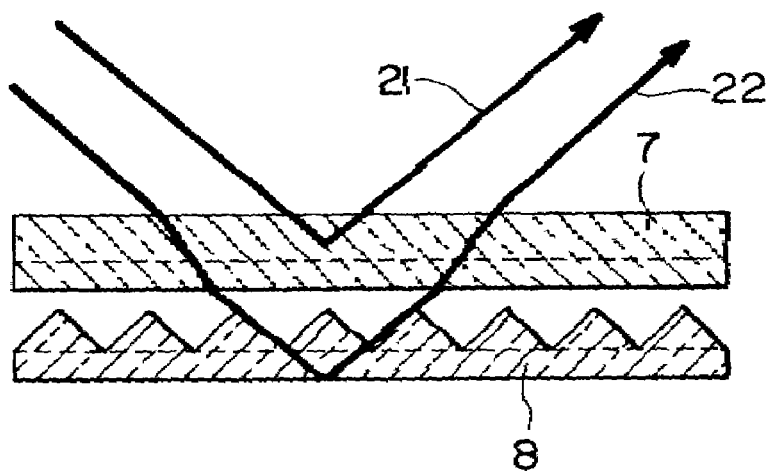

FIGS. 3A and 3B show the principle of occurrence of a moiré fringe. As shown in FIG. 3A, when two gratings consisting of a real-image grating 21 and virtual-image grating 22 are superposed on each other at a small angle, a moiré fringe 23 is generated. More specifically, as shown in FIG. 3B, grating fringes (real-image grating) 21 generated in the upper lens sheet 7 include two reflection paths. According to one path, light is reflected by the upper lens sheet 7. According to the other path, light is transmitted through the upper lens sheet 7 and is reflected by the lower lens sheet 8. The grating fringes generated by the former path correspond to a grating directly generated in the upper lens sheet 7, which is the real-image grating 21. The grating fringes generated by the latter path correspond to a reflected image of the real-image grating 21, which is a virtual-image grating 22. If a polarizing plates and lens sheets are surface-roughened, when light is transmitted through or reflected by them, the grating fringes are scattered to become thin, and the moiré fringe can be suppressed.

As described above, the most significant point of the present invention resides in finding the presence of an optimum combination of the roughnesses of the roughened surface 15 of the lower polarizing plate 4, the roughened surface 16 of the upper lens sheet 7, and the roughened surface 17 of the lower lens sheet 8. More specifically, when the roughnesses of the roughened surfaces of the lower polarizing plate 4 and of the upper lens sheets 7 and 8 are set to a predetermined relationship, the roughened surfaces will not scatter the light from the backlight unit to decrease the luminance of the liquid crystal display device, but the moiré fringe can be suppressed from being recognized.

The arrangement of this embodiment of the present invention will be described by referring to the sectional view of FIG. 4 showing the schematic arrangement of the liquid crystal display device according to one embodiment of the present invention. This liquid crystal display device is mainly comprised of the liquid crystal display panel 5, backlight unit 6, the driver IC (not shown) for driving the liquid crystal display panel 5, and the signal control circuit (not shown) for the driver IC. The liquid crystal display panel 5 is obtained by sealing the peripheries of the upper and lower electrode substrates 2 and 3, sealing liquid crystal (not shown) between the upper and lower electrode substrates 2 and 3, and adhering the upper and lower polarizing plates 1 and 4 on the upper and lower surfaces, respectively, of the resultant structure. The backlight unit 6 is comprised of the fluorescent tube 13, reflector 12, light guide plate 10, reflecting sheet 11, diffusing sheet 9, upper lens sheet 7, and lower lens sheet 8. The upper polarizing plate 1 of the liquid crystal display panel 5 is surface-roughened for antiglare, and is covered with a hardcoat so it will not be damaged easily. The surface roughening process of the upper polarizing plate 1 may be performed in any manner as far as an antiglare effect can be obtained. (1) Formation of random three-dimensional patterns (embosses) such as satin patterns on the base material of the polarizing plate, (2) addition or dispersive application of a matting agent to a flat sheet serving as a base material, or the like is preferable because a polarizing plate obtained in such a manner has a high machinability and is easy to handle. The surface roughening process of the upper polarizing plate 1 aims at preventing external light such as light from a ceiling light from being reflected by the upper polarizing plate 1, so that the visibility of display is improved. Accordingly, as the upper polarizing plate 1, other than that subjected to the surface roughening process, one having a low-reflecting film formed on its outer surface to obtain a low-reflection effect may be used. The surface roughening process for the upper polarizing plate 1 must be performed carefully because, if the roughened surface is excessively rough, display is blurred and sharpness of the image is degraded. In the present invention, a polarizing plate having a haze (value of cloudiness) of 13±3% is employed in consideration of this respect. A haze is the ratio of a diffused transmittance to a full light beam transmittance. The lower polarizing plate 4 is also surface roughened. How and in what manner the roughened surface 15 on the lower polarizing plate 4 is formed can be the same as those of the upper polarizing plate 1. Note that as the lower polarizing plate 4, one formed with a low-reflecting film is not used. The surface roughness of the roughened surface 15 of the lower polarizing plate 4 is preferably equal to or lower than that of the roughened surface 14 of the upper polarizing plate 1. This is because if the roughness of the roughened surface 15 of the lower polarizing plate 4 is larger than that of the roughened surface 14 of the upper polarizing plate 1, light from the backlight unit 6 may be scattered by the roughened surface 15, and the amount of light transmitted through the liquid crystal display panel 5 decreases to decrease the luminance. The backlight unit 6 is comprised of optical members such as the fluorescent tube 13, reflector 12, light guide plate 10, reflecting sheet 11, diffusing sheet 9, and upper and lower lens sheets 7 and 8. These optical members will be described. The fluorescent tube 13 is the light source of the backlight unit 6. A cold cathode tube is often used as the fluorescent tube 13 because it has a long service life, generates low-temperature heat, has a comparatively simple electrode structure, and can be formed thin, and is used in the present invention as well. The reflector 12 reflects light from the fluorescent tube 13 to launch it into the light guide plate 10 efficiently. As the reflector 12, one formed by depositing Al, Ag, or the like on a film base material so that it acquires specular reflection performance is used. The reflecting sheet 11 serves to reflect light propagating through the light guide plate 10 toward the liquid crystal display panel 5. As the reflecting sheet 11, in order to improve the luminance uniformity of the backlight unit 6, a white film material which causes diffused reflection is often used. The light guide plate 10 propagates light from the fluorescent tube 13 and outputs it toward the liquid crystal display panel 5, so that the liquid crystal display panel 5 serves as a surface light source. As the light guide plate 10, one having small light loss during propagation is preferable. As a material often used to form the light guide plate 10, an acrylic resin can be raised. A diffusion pattern (not shown) is formed on the reflecting sheet 11 side surface of the light guide plate 10 to improve the luminance uniformity. In this embodiment, dot printing is performed to form a diffusion pattern. The diffusion pattern can be of any type and can have any shape as far as it can improve the luminance uniformity. The diffusing sheet 9 further scatters light that cannot be uniformed by the diffusion pattern of the light guide plate 10, and makes light directly emitted by the fluorescent tube 13 hardly visible.

Light output toward the liquid crystal display panel 5 is scattered to a large extent, although its luminance uniformity is improved by the diffusion pattern of the light guide plate 10 and the diffusing sheet 9. In practice, scattering is preferably done within the range of angle with which the observer observes light. Therefore, light is condensed by the lens sheet. In the present invention, a lens sheet obtained by forming a group of small triangular prisms on one surface of a sheet is used. One to a plurality of lens sheets are used. In the present invention, two lens sheets are used to enhance the light condensing effect. The two lens sheets are arranged such that the major axes of the prisms of the upper lens sheet 7 are perpendicular to those of the lower lens sheet 8. The two lens sheets may be arranged such that the major axes of the prisms of the upper lens sheet 7 do not become parallel to the arrays of pixels on the liquid crystal display panel 5. As the upper and lower lens sheets 7 and 8, those each having a roughened surface on the opposite side of the prism surface are used. The upper lens sheets 7 and 8 may be surface-roughened in any manner as far as they achieve a scattering function in the same manner as the formation method of the polarizing plate does. In the present invention, lens sheets each obtained by dispersively applying a matting agent to a flat sheet serving as a base material are used.

The polarizing plates 1 and 4, and lens sheets 7 and 8 originally serve to transmit light. In the present invention, the lower polarizing plate 4 and upper and lower lens sheets 7 and 8 are surface-roughened. If the roughnesses of the roughened surfaces are increased, light scattered by the roughened surfaces increases to decrease the amount of transmitted light. Then, light emitted by the backlight unit 6 can be scattered before being transmitted through the liquid crystal display panel 5, so its luminance is decreased. In the present invention, in order to satisfy both requirements for suppression of the moiré fringe and prevention in decrease of the luminance, a suitable combination of the roughness of the roughened surface 15 of the roughened surface 14, and the roughnesses of the roughened surface 16 of the upper lens sheet 7 and of the roughened surface 17 of the lower lens sheet 8 was experimentally determined.

More specifically, regarding the roughnesses of the roughened surfaces of the lower polarizing plate 4 and lens sheets 7 and 8, when the haze of the lower polarizing plate 4 was about 5% to 13% and the lens sheets had the light transmission characteristics falling under type C and type D, the luminance hardly decreased, and a moiré fringe could be prevented. In the present invention, the roughnesses of the roughened surfaces of the upper and lower lens sheets 7 and 8 are the same. When the roughnesses of the roughened surfaces of the upper and lower lens sheets 7 and 8 are different, a more suitable combination of roughened surfaces can obviously be obtained.

In the prism group described above, since the gap among the axes of the prisms is as very small as about 20 μm to 50 μm, when handling the lens sheet, the operator may rub against the prisms with his or her fingers to flatten them, thus damaging the prisms. In order to prevent damage to the prisms, as the upper lens sheet 7, one having prisms with rounded vertices so it will not be damaged easily may be used.

The operation of the embodiment of the present invention will be described.

FIGS. 2A and 2B explain how grating fringes are generated by a prism group formed on the surface of a lens sheet. A grating 18 shown in FIG. 2A is generated when the reflected light beams 19 acquire directivity upon being reflected by the slants of the group of prisms of the lens sheet 20 shown in FIG. 2B.

FIGS. 3A and 3B show the principle of occurrence of a moiré fringe. A moiré fringe is formed when two gratings are superposed on each other at a small angle, as shown in FIG. 3A. In the liquid crystal display device, the small-angle displacement is caused by deflection of each of the two lens sheets. How the two gratings are produced will be described. When external light such as light from a ceiling light becomes incident on the liquid crystal display device and reaches the upper lens sheet 7, the grating fringes generated in the upper lens sheet 7 include two reflection paths. According to one path, light is directly reflected by the upper lens sheet 7. According to the other path, light is transmitted through the upper lens sheet 7 and is reflected by the lower lens sheet 8. The grating fringes generated by the former path correspond to a grating directly generated in the upper lens sheet described above in FIGS. 2A and 2B, which is the real-image grating 21. The grating fringes generated by the latter path correspond to a reflected image of the real-image grating 21 reflected by the lower lens sheet 8, not generated by the prism group directly, and accordingly correspond to the virtual-image grating 22. If the polarizing plate and the lens sheet are surface-roughened as shown in FIGS. 2A and 2B, while light is transmitted through or reflected by them, the grating fringes are scattered to become thin, and the moiré fringe can be suppressed. This will be explained in more detail. When light is transmitted through the liquid crystal display panel 5, the real-image grating is scattered by the roughened surfaces 15 and 14 and becomes blurred. The virtual-image grating is scattered by the roughened surface 17 during reflection, and is scattered by the roughened surfaces 16, 15, and 14 again to become blurred. When two gratings are superposed on each other, portions where the two gratings largely overlap and portions where they do not provides a higher contrast than those of the original gratings do. This contrast becomes an optical illusion and is visually recognized. Therefore, if the original grating fringes are thinned by the roughened surfaces, even if they overlap, no moiré fringe will be recognized. While the roughened surfaces suppress the moiré fringe, they also scatter light from the backlight unit 6. If the surface roughnesses are excessively increased for suppressing the moiré fringe, the luminance decreases. As the roughened surface 14, one which can provide an antiglare effect while not causing display blurring is appropriate. The roughened surfaces 15, 16, and 17 must be those that suppress the moiré fringe while they do not decrease the luminance very much.

Figure 5:
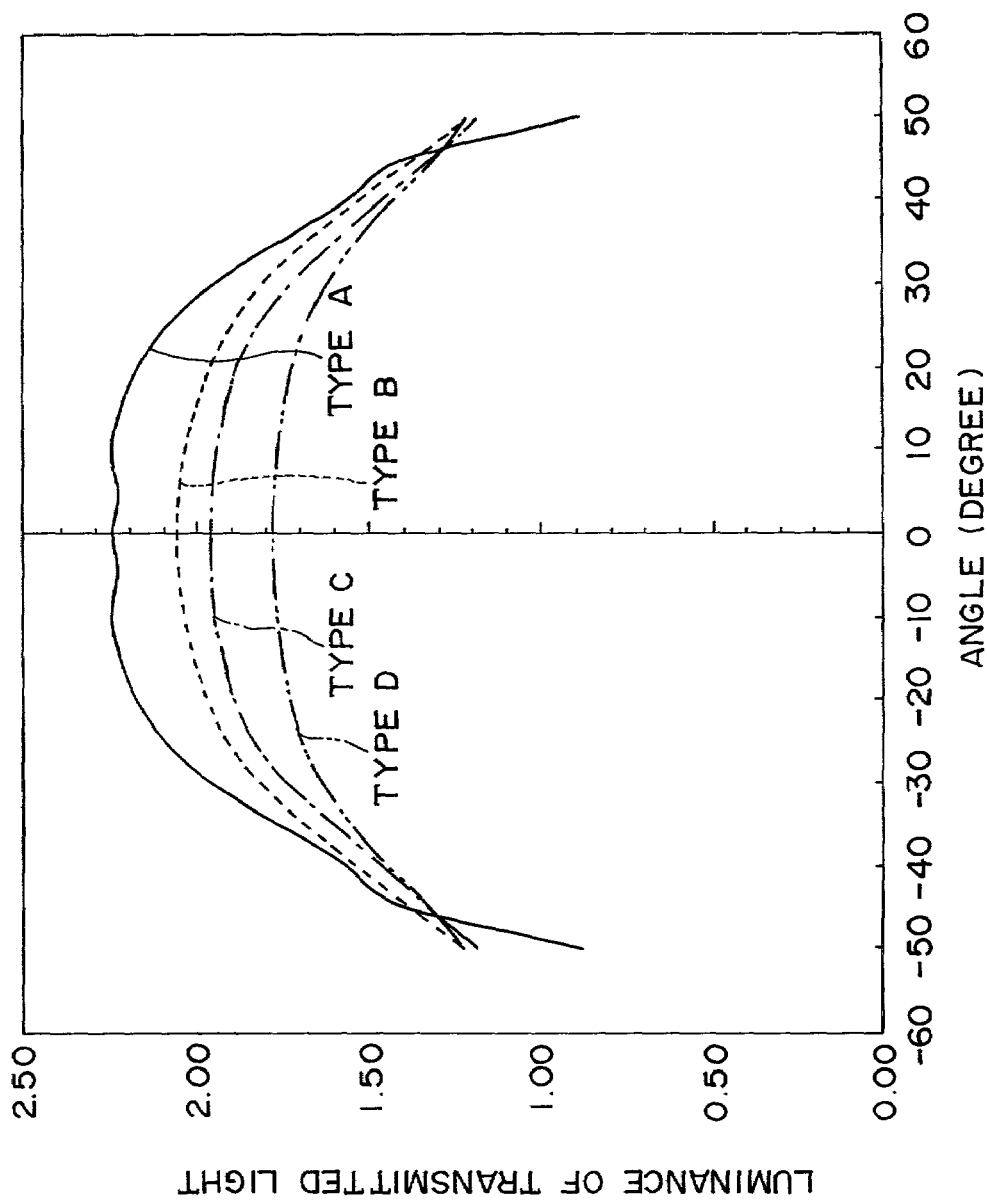
FIG. 5 is a graph showing the light transmission characteristics of surface-roughened lens sheets.
Figures 6, 7:
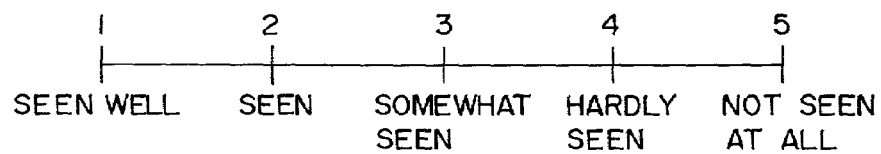
FIG. 6 is a table showing the results obtained by observing occurrence of a moiré interference fringe depending on combinations of the surface roughness of the roughened surface of the lower polarizing plate and the surface roughnesses of the roughened surfaces of the upper and lower lens sheets.
FIG. 7 is a table showing the results obtained by measuring the influence on the luminance depending on combinations of the surface roughness of the roughened surface of the lower polarizing plate and the surface roughnesses of the roughened surfaces of the upper and lower lens sheets.

Experimental results clearly showing the effect of the embodiment of the present invention will be described with reference to FIGS. 5 to 7. FIG. 5 shows the light transmission characteristics of lens sheets. FIG. 6 shows the results obtained by observing occurrence of a moiré interference fringe depending on combinations of the roughness of the roughened surface of the lower polarizing plate 4 and the roughnesses of the roughened surfaces of the upper and lower lens sheets 7 and 8. FIG. 7 shows the results obtained by measuring the influence on the luminance depending on combinations of the roughness of the roughened surface of the lower polarizing plate 4 and the roughnesses of the roughened surfaces of the upper and lower lens sheets 7 and 8. From the results of FIGS. 6 and 7, a suitable combination that prevents occurrence of a moiré fringe and decrease in luminance is present for the roughnesses of the roughened surfaces of the lower polarizing plate 4 and upper and lower lens sheets 7 and 8.

FIG. 6 shows the results obtained by evaluating whether a moiré fringe is recognized depending on the combinations of the roughness of the roughened surface 15 of the lower polarizing plate 4 and the roughnesses of the roughened surfaces of the upper and lower lens sheets 7 and 8, as described above. The haze (value of cloudiness) of the lower polarizing plate 4 was changed among 5±2%, 0±2%, 13±3%, and 28±4%. Evaluation was made in 5 levels of 1 to 5 sequentially indicating seen well, seen, somewhat seen, hardly seen, not seen at all. According to FIG. 6, the larger the roughnesses of the roughened surfaces of the lower polarizing plate 4 and the lens sheets, the more the lattice fringe images that produce the moiré fringe are scattered to become thin, to an unrecognizable degree. In this embodiment, whether a moiré fringe was present or not was confirmed in a meeting room lit by a cool white fluorescent lamp, at a position 50 cm away from the liquid crystal display device. In the test, the field of view of the observer was moved vertically and horizontally by about 50° with respect to the direction of normal to the display surface of the liquid crystal display device, and whether a moiré fringe was present was checked. The roughness of the roughened surface of the polarizing plate was defined by a haze (value of cloudiness) represented by the ratio of the diffused transmittance to the full light beam transmittance. This is because the roughness of the roughened surface and the transmittance are closely related to each other. Namely, for example, if the roughness of the roughened surface increases, the amount of light scattered by the roughened surface increases, and the transmittance decreases. The degree of light scattered by the roughened surface of the lens sheet cannot be represented by haze, as the light condensing effect by the prism group is added to it. Therefore, the characteristics of the transmitted luminance with respect to the measured angle were actually measured.

FIG. 5 shows the optical transmission characteristics of the lens sheets. The luminance obtained after light is transmitted through the lens sheet with respect to the luminance of the surface light source is indicated as a function of angle. Starting from type A, the closer to type D, the smaller the luminance obtained at 0 ° and the flatter the distribution of luminance with respect to the angle, and accordingly the higher the scattering degree. The direction of normal to the lens sheet corresponds to 0°.

FIG. 7 shows the results obtained by studying the influence on the luminance while variously combining the roughness of the roughened surface 15 of the lower polarizing plate 4 and the roughnesses of the roughened surfaces 16 and 17 of the upper and lower lenses. The haze (value of cloudiness) of the lower polarizing plate 4 was changed among 5±2%, 0±2%, 13±3%, and 28±4%. The obtained results were compared with the luminance obtained when neither of the lower polarizing plate 4 and the upper and lower lens sheets were surface-roughened at all as 100%. According to FIG. 7, if the roughnesses of the roughened surfaces of the lower polarizing plate 4 and of the lens sheets are excessively large, the luminance decreases. To measure the luminance, a luminance meter (Topcon BM-5A) was used. The luminance after the light was transmitted through the liquid crystal display panel was measured in a dark room at room temperature of 25° of Celsius with no wind and no ambient light. The distance between the liquid crystal display device and the luminance meter was 50 cm. The luminance in a direction normal to (of the front surface of) the liquid crystal display surface was measured with monochromatic maximum gradation indication. The aperture angle of the luminance meter is 1°. According to the results of these experiments, to improve the moiré fringe by means of merely the roughening process of the polarizing plate, the degree of the surface roughening process must be increased. Then, light scattering increases to decrease the luminance. If the degree of the surface roughening process of the polarizing plate and that of the lens sheets are combined in an optimum manner, as in the present invention, the moiré fringe can be improved substantially free from a decrease in luminance.

As has been clarified in FIGS. 6 and 7, a suitable combination is present for the respective roughened surfaces. When the suitable combination is selected, suppression of both the moiré fringe and of a decrease in luminance can be realized.

Another embodiment of the present invention will be described.

In the above embodiment, the roughnesses of the roughened surfaces of the upper and lower lens sheets 7 and 8 are the same. Obviously, a more suitable combination of roughened surfaces can be obtained by changing the roughnesses of the roughened surfaces of the upper and lower lens sheets 7 and 8. A moiré fringe is a phenomenon produced by gratings having the same grating constant. If the gaps of the prisms of the lens sheets 7 and 8 are not set to equal pitches but are set to random pitches different from each other, even when the real-image grating 21 and virtual-image grating 22 are superposed, the contrast decreases and the moiré fringe becomes hard to recognize. When the pitches of the prisms are further increased to increase the pitches of the grating fringes, the contrast between portions where the gratings largely overlap and portions where they do not decreases, and the moiré fringe accordingly becomes hard to recognize. If a diffusing sheet is interposed between the upper and lower lens sheets 7 and 8, although the thickness of the device increases, the diffusing sheet plays a role of the roughened surface of the lens sheet, which is effective in decreasing the moiré fringe.

The above method is based on measures (1) thinning the image of the grating itself that causes the moiré fringe so that the contrast of the formed moiré fringe is decreased, and (2) forming a scattering layer between or on two gratings that interfere with each other so that the contrast of the moiré fringe is decreased. The above method obviously includes any measures based on those of items (1) and (2).

What is claimed is:

1. A liquid crystal display device comprising:
   a liquid crystal display panel having an electrode substrate unit and upper and lower polarizing plates, said electrode substrate unit being comprised of upper and lower electrode substrates arranged adjacent to each other, and said upper and lower polarizing plates being adhered to two outer surfaces, respectively, of said electrode substrate unit so as to transmit only light having a polarization plane in a constant direction;
   a backlight unit having a fluorescent tube serving as a light source, a reflector, a light guide plate, a reflecting sheet and a diffusing sheet sequentially arranged above said light guide plate to be substantially parallel to said light guide plate, and a plurality of lens sheets inserted between said diffusing sheet and said electrode substrate unit to be substantially parallel to each other; and
   a driver IC for driving said liquid crystal display panel and a signal control circuit for said driver IC,
   said upper polarizing plate having a first roughened surface on an outer surface thereof, which is formed for antiglare, and said lower polarizing plate having a second roughened surface on an outer surface thereof, which is formed so as to have a surface roughness not more than that of said first roughened surface, so that a moiré fringe generated by a presence of said plurality of lens sheets is decreased,
   said plurality of lens sheets being two sheets consisting of an upper lens sheet arranged near said liquid crystal display panel and a lower lens sheet arranged to be separate from said liquid crystal display panel,
   each of said upper and lower lens sheets being formed with a group of small prisms on one surface thereof,
   said group of small prisms of said upper lens sheet being formed of at least one of rounded vertices and vertices of random pitch,
   said upper lens sheet having a third roughened surface which is formed on the other surface thereof, and said lower lens sheet having a fourth roughened surface which is formed on the other surface thereof,
   said third and fourth roughened surfaces excluding a group of small prisms,
   said upper and lower lens sheets being arranged such that the major axes of said small prisms of the upper lens sheet are perpendicular to those of the lower lens sheet.

2. A liquid crystal display device according to claim 1, wherein said lower polarizing plate has a haze (value of cloudiness) of approximately 5% to 13%.

3. A liquid crystal display device according to claim 1, wherein said upper and lower lens sheets are arranged such that the major axes of the prisms of the upper lens sheet do not become parallel to the arrays of pixels on the liquid crystal display panel.

4. A liquid crystal display device according to claim 1, wherein the relationship between the roughness of the roughened surface of said lower polarizing plate and each roughness of the roughened surfaces of said upper and lower lens sheets is preset, and each of the roughened surfaces are formed by adding or dispersively applying a matting agent on a flat sheet serving as a base material.

5. A liquid crystal display device according to claim 1, wherein the roughness of the roughened surfaces of said upper and lower lens sheets can be made to a suitable combination by allowing to differ from each other.

6. A liquid crystal display device according to claim 1, wherein said upper and lower lens sheets are arranged such that the major axes of the prisms of the upper lens sheet do not become parallel to the arrays of pixels on the liquid crystal display panel, and
   wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material.

7. A liquid crystal display device according to claim 1, wherein said upper and lower lens sheets are arranged such that the major axes of the prisms of the upper lens sheet do not become parallel to the arrays of pixels on the liquid crystal display panel, and
   wherein said polarizing plate has a haze (volume of cloudiness) of approximately 5% to 13%.

8. A liquid crystal display device according to claim 1, wherein said upper and lower lens sheets are arranged such that the major axes of the prisms of the upper lens sheet do not become parallel to the arrays of pixels on the liquid crystal display panel, and
   wherein the roughness of the roughened surfaces of said upper and lower lens sheets can be made to a suitable combination by allowing to differ from each other.

9. A liquid crystal display device according to claim 1, wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material, and
   wherein said polarizing plate has a haze (volume of cloudiness) of approximately 5% to 13%.

10. A liquid crystal display device according to claim 1, wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material, and
   wherein the roughness of the roughened surfaces of said upper and lower lens sheets can be made to a suitable combination by allowing to differ from each other.

11. A liquid crystal display device according to claim 1, wherein said upper and lower lens sheets are arranged such that the major axes of the prisms of the upper lens sheet do not become parallel to the arrays of pixels on the liquid crystal display panel,
    wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material, and
    wherein said polarizing plate has a haze (volume of cloudiness) of approximately 5% to 13%.

12. A liquid crystal display device according to claim 1, wherein said upper and lower lens sheets are arranged such that the major axes of the prisms of the upper lens sheet do not become parallel to the arrays of pixels on the liquid crystal display panel,
    wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material, and wherein the roughness of the roughened surfaces of said upper and lower lens sheets can be made to a suitable combination by allowing to differ from each other.

13. A liquid crystal display device according to claim 1, wherein said upper and lower liens sheets are arranged such that the major axes of the prisms of the upper lens sheet do not become parallel to the arrays of pixels on the liquid crystal display panel, wherein the relationship between the roughness of the roughened surface of said lower polarizing plate and each roughness of the roughened surfaces of said upper and lower lens sheets are preset, and each of the roughened surfaces are formed by adding or dispersively applying a matting agent on a flat sheet serving as a base material, wherein said polarizing plate has a haze (volume of cloudiness) of approximately 5% to 13%, and wherein the roughness of the roughened surfaces of said upper and lower lens sheets can be made to a suitable combination by allowing to differ from each other.

\* \* \* \* \*